United States Patent [19]
Payne

[11] Patent Number: 4,781,356
[45] Date of Patent: Nov. 1, 1988

[54] PINCH TYPE VALVES

[75] Inventor: Barrett M. M. Payne, Bulawayo, Zimbabwe

[73] Assignee: John Lawrence Sullivan, Bulawayo, Zimbabwe; a part interest

[21] Appl. No.: 67,780

[22] Filed: Jun. 26, 1987

[30] Foreign Application Priority Data

Jun. 30, 1986 [RH] Zimbabwe .............................. 123/86

[51] Int. Cl.⁴ .............................................. F16K 7/06
[52] U.S. Cl. .................................... 251/8; 251/7
[58] Field of Search .................................. 251/7, 8

[56] References Cited

U.S. PATENT DOCUMENTS

| 3,759,483 | 9/1973 | Baxter | 251/7 |
| 4,322,054 | 3/1982 | Campbell | 251/7 |
| 4,620,690 | 11/1986 | Kamen | 251/8 |

FOREIGN PATENT DOCUMENTS

| 719207 | 3/1942 | Fed. Rep. of Germany | 251/8 |
| 596483 | 3/1978 | France | 251/7 |
| 1388294 | 3/1975 | United Kingdom | 251/8 |

Primary Examiner—A. Michael Chambers
Attorney, Agent, or Firm—Davis, Bujold & Streck

[57] ABSTRACT

The invention is concerned with valves generally and more particularly with valves with the type known as pinch valves being those valves which are closed or opened by the action of pinching or releasing a resiliently deformable sleeve. The invention is characterized principally in having a light weight open-sided box section valve housing combined with a pair of substantially cylindrical sleeve supports which allow the use of a resilient sleeve which incorporates no internal bracing.

5 Claims, 6 Drawing Sheets

PINCH TYPE VALVES

This invention is concerned with valves generally and more particularly with valves of the type known as pinch valves, being those which are closed and opened by the action of pinching or releasing a resiliently deformable sleeve. Valves of this kind are commonly used in particularly, the mining industry, although they are found in practically any application where abrasive or corrosive substances are being pumped. In such aforementioned applications it is also not uncommon to find the well known diaphram type valve.

Principle amongst the reasons for using such valves is that the abrasive/corrosive nature of substances being pumped would soon destroy the close tolerances found in the more common gate valve, thus rendering such valves unservicable in a short period of time. It has been found that the pinch type valve is the most suitable in such applications as the sleeves are generally made from a heavily reinforced rubber compound which is resistent to wear/corrosion.

The nature of presently known and used pinch valves is such that they suffer from a number of diadvantages, not least of which is their extremely high cost, dictated largely by the flanged sleeves which are of necessity hand made, requiring intricate reinforcing to be able to withstand high internal fluid pressures as well as the repeated operations of opening and closing.

As these sleeves are so heavily reinforced, heavy and expensive closure mechanisms are needed in order to overcome firstly the resilience of the sleeve itself and secondly the large internal area of opposing forces present within the sleeve even at modest fluid pressures. In addition to the above, the action of closing the valve by pinching the sleeve imposes enormous localised strain on the reinforcing fibres of the sleeve, rapidly causing delamination of the fibres which in turn weakens the sleeve until it ultimately fails.

As a result of the combined aforementioned disadvantages, the sleeves currently employed do not enjoy a long working life and on average require replacing within a period of between eighteen months and two years.

By way of comparison, diaphram valves also suffer from a number of significant disadvantages. By and large, such valves are generally less expensive than their pinch type counterparts but they are not able to withstand the same high fluid pressures.

As will be generally known, diaphram valves operate on a princple of inducing a flexible diaphragm into sealing abutment with a seating arrangement, usually of metal. The diaphram rubber is generally comparatively thin in section and sometimes rather hard. This latter restriction is determined more by the requirement to ensure an adequate seal between the valve body and the spindle housing than the need for a hard wearing long life diaphram.

Because of the relatively large surface area of the average diaphram, very high forces are required in order to overcome the internal fluid pressures when attempting to close the valve. This once again necessitates the use of elaborate costly closure means which in some instances involve the use of mechanical assistance in the form of gearboxes or even hydraulic/pnematic assistance. It is mainly for this reason that such valves are not suitable for high pressure applications.

At the moment just prior to final closure, any particals in the fluid tend to become trapped and rapidly build up between the diaphram and the seating arrangement, largely as a result of the wedge shaped lead into the closing gap. As high clamping forces are required to effect a proper seal, the tendency is for such particals to become impregnated into the rubber diaphram which causes rapid deterioration and premature failure.

It will be appreciated from the aforementioned discourse that there is a need to improve many aspects of valve technology and it is with this in mind that the inventor has devised what is believed to be a novel pinch type valve which encompasses a number of significant advantages and which it is believed will be readily suitable as a substitute for presently known and used valves in most applications.

Therefore, according to the invention, a valve comprising in working combination a housing; interposed between two opposite sides of said housing in spaced apart substantially parallel alignment with one another, a pair of generally cylindrical sleeve supports, said supports including belled or flared formations at their opposing ends and further being adapted so as to received and retain in a sealed manner, a resiliently deformable sleeve; means adapted to open or close the valve by inducing pinching formations into open or closed relationship about the flexible sleeve; the housing further being adapted to be coupled to one or more corresponding flange faces at each opposite end. Further according to the invention a valve as aforementioned characterised in that the valve housing comprises an open-sided box formation of relatively light guage material, strength being inherent in the housing because of the box shape.

In order to facilitate the further understanding of the invention, one or more preferred embodiments will now be described in detail with reference to the accompanying drawings but without limitation of the basic inventive concept of the invention.

In the ensuing description, like reference numerals will refer to the same parts throughout.

Figure 1:
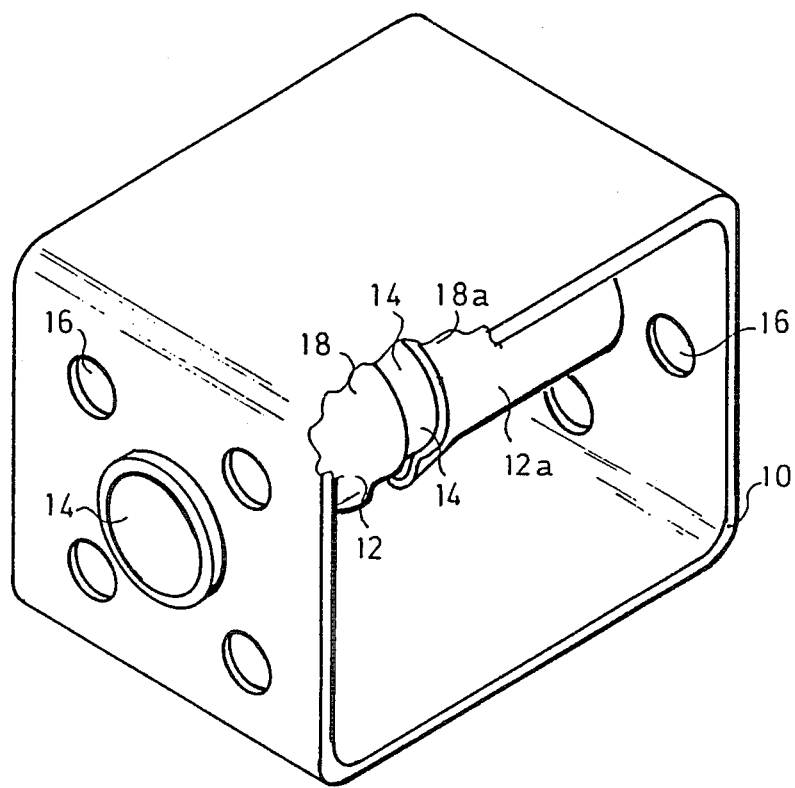
FIG. 1 represents a schematic isometric projection of a valve housing according to the invention.

Referring firstly to FIG. 1 the general idea of the valve housing can be seen with its box-section 10 comprising the principle structure. The sleeve supports 12 and 12a can be seen with flexible sleeve 14 in place. Holes 16 may either be provided at the time of principal manufacture or may be subsequently drilled to accept all flange table drillings. These holes 16 then provide a means for coupling the valve to any conventional pipe flange or pipe fitting (not shown). The flared portions 18 and 18a of the sleeve supports 12 and 12a can also be clear)y seen. These flared portions 18 and 18a are necessary to allow for the distortion of the sleeve 14 when it is in the pinched closed position.

Figure 2:
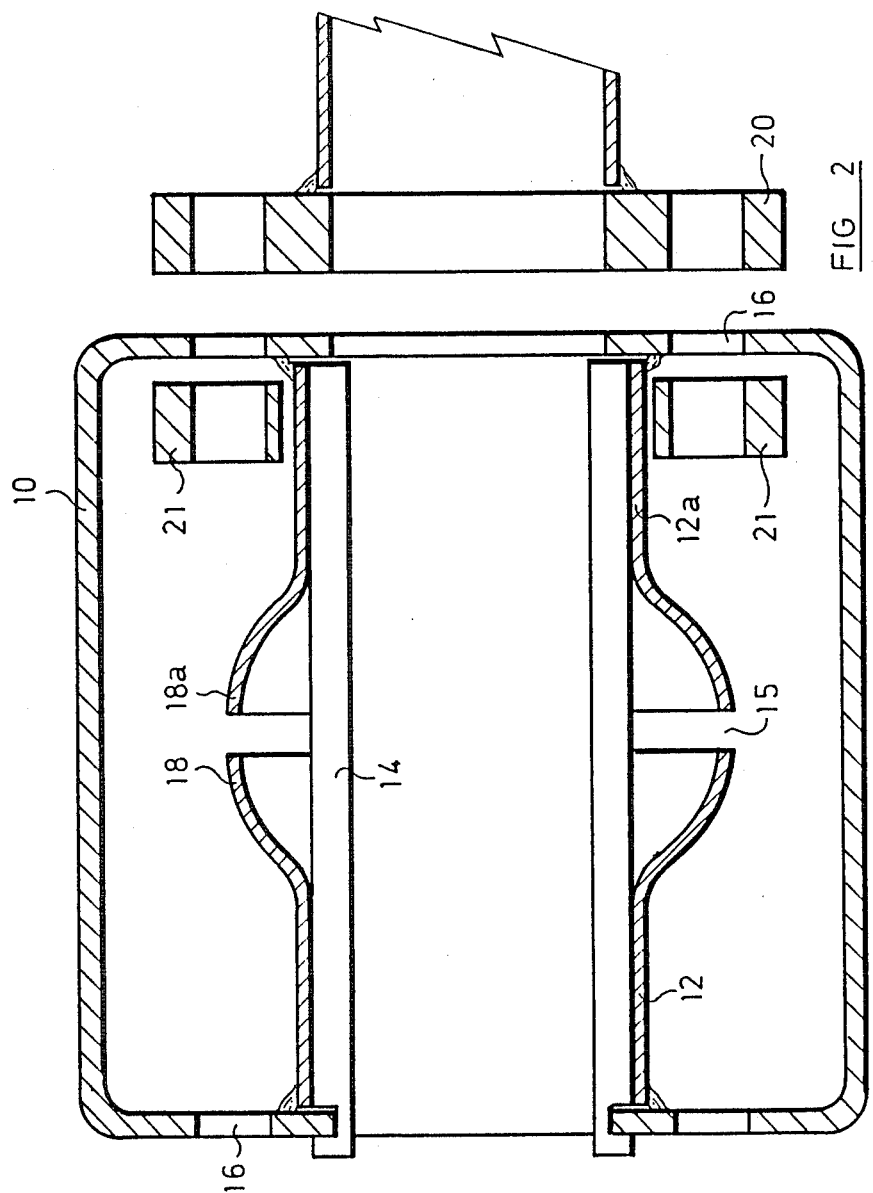
FIG. 2 represents a schematic cross-sectioned side elevation of the housing shown in FIG. 1.

Referring to FIG. 2, the respective arrangements of the various components can be more clearly seen. The sleeve 14 can be made from any suitable flexible material and does not require reinforcing as is the case with the prior art. The sleeve 14 can generally be made from a relatively thick section soft rubber compound which will allow a long working life but which allows the gap 15 between the sleeve supports 12 to be reduced to a minimum. Because the sleeves remain relatively flexible, thin section pinch plates may be used without inflicting damage to the flexible sleeve 14. This view of the invention clearly illustrates the method by which the flexible sleeve 14 is externally braced by the sleeve supports 12 and 12a. This external bracing allows one to dispense with the very costly hand made sleeves which are a feature of the presently known and used pinch valves. In practice the sleeve 14 will generally be either bonded to the sleeve supports 12 and 12a where they contact same and this will generally ensure a watertight seal. As pressure is increased within the pipeline; the sealing is assisted by the action of the fluid pressure acting upon the internal surfaces of the sleeve 14 thus creating a lip-seal effect between the sleeve 14 and the external bracing 12 and 12a. An alternative method which also provides a flange seal between the valve housing and any corresponding pipe flange is illustrated in FIG. 2 where the flexible sleeve 14 may be flanged as illustrated and when used in this manner, the bonding aforementioned becomes optional.

Figure 5:
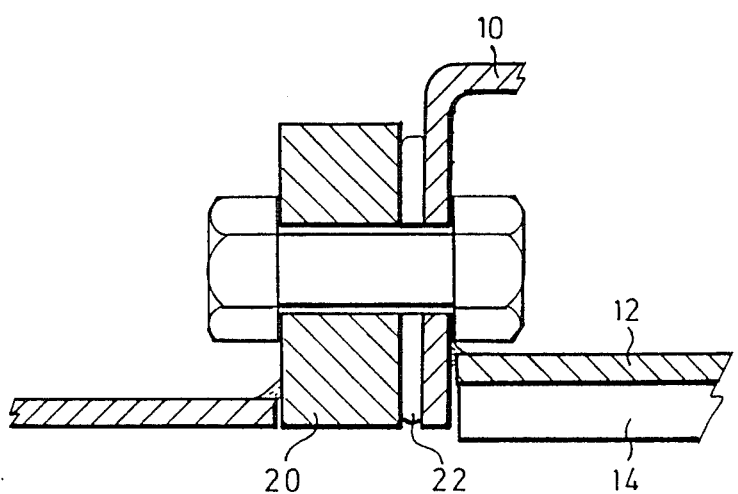
FIG. 5 represents a schematic cross-section showing part of the valve housing of the invention and one method of coupling to a conventional pipe flange.

In addition to the aforementioned advantages, the elastic nature of the sleeve 14 permits a substantial thickness of rubber to be pulled or drawn by the pinch plates to where it is needed, that is at the closure faces. It will be readily apparent that it will be an easy matter to effect replacement of the sleeve when this becomes necessary. Also illustrated in FIG. 2 is the relationship between the housing 10 and a conventional type flange 20. A more detailed view of the actual coupling can be seen in FIG. 5 where a gasket 22 is incorporated between the two abutting surfaces.

Figure 3:
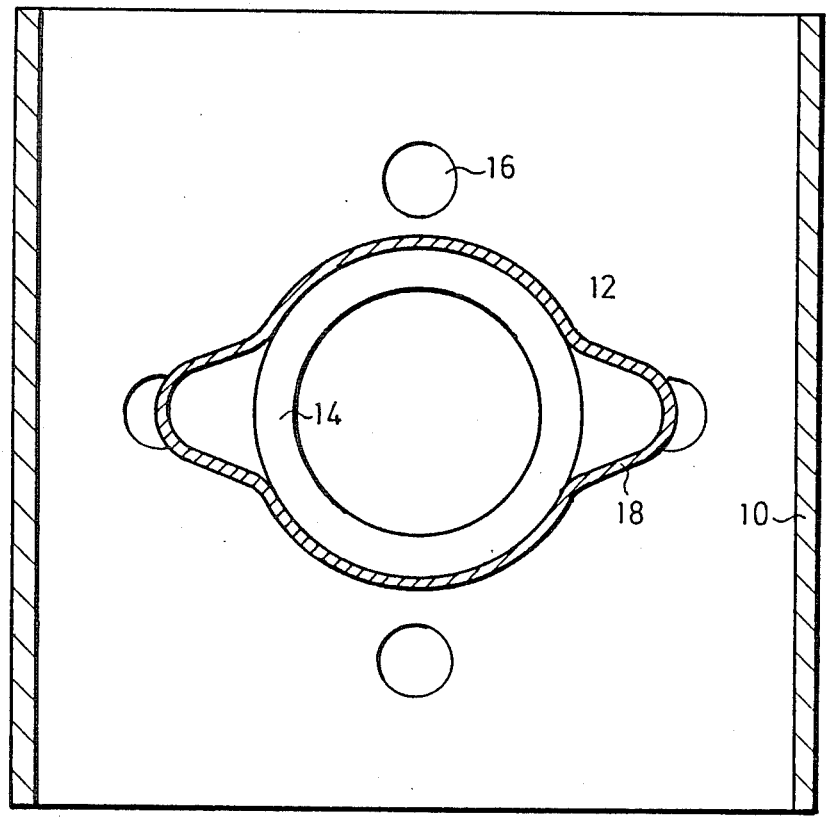
FIG. 3 represents a schematic cross-sectional end elevation of the housing of FIG. 1.
Figure 4:
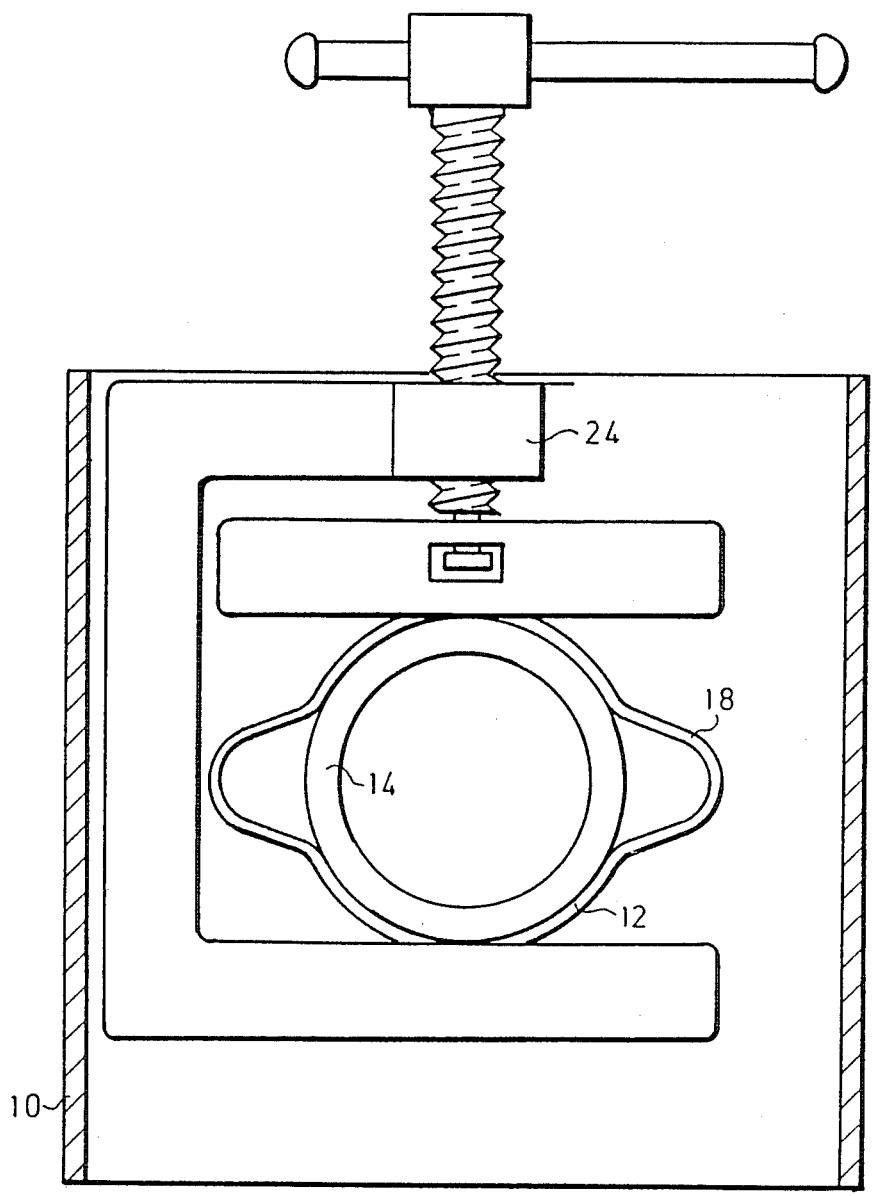
FIG. 4 represents a schematic cross-sectional end elevation of the housing of FIG. 1 showing one method of actuating the valve.

The view shown in FIG. 3 clearly shows the flared portions 18 and 18a of the sleeve supports 12. This flared portion 18 is necessary to allow the sleeve 14 to he distorted sufficiently to cut off the flow of whatever is being passed through the valve when the valve is closed. FIG. 4 indicates one method by which the sleeve 14 may be pinched closed, in this instance utilizing a 'G' clamp 24. One could of course use any suitable conventional method but the elastic nature of the sleeve 14 ensures that when under internal pressure it fills every contour including the contour of the pinch plates, thus the total area of displacement on closure is kept to a minimum and thus greatly reducing the closing forces needed and thus enabling one to dispense with the costly and elaborate arrangements which are a feature of the prior art.

The box section design of the housing 10 is a significant feature of the invention as the box shape imparts a considerable inherent strength to the unit which enables it to be manufactured from relatively thin section mild steel plate. This enables the valve of the invention to be mass produced with simple tooling at costs which are significantly less than the existing prior art which in the main, require valve housings to be expensively cast from either bronze or iron.

Investigations have shown that the valve housing of the invention particularly when forming part of a pipe line, is capable of withstanding considerable internal pressures and tests have been conducted to as high as 400 pounds per square inch without causing permanent damage to the valve. However, in normal use the valve of the invention will be intended to be used at pressures up to 150 pounds per square inch and at such pressures, it has been found that the box section design is well able to withstand the sort of shock loadings which may be encountered in pipeline engineering.

In FIG. 2 it is clearly illustrated that the outer ends of the sleeve supports 12 and 12a are welded to the inner side of the open box housing 10, the weld being effected in the closest practical proximity of the pitch circle diameter of the flange drillings 16. This is done deliberately in order to provide a substantial reinforced back-up to the basic box shaped housing 10 and prevents the high internal fluid pressure from blowing through or deforming the thin wall of the flange housing 10 when same is bolted together with corresponding flange 20.

In the closed position, the pressurized fluid within the resilient sleeve 16 will result in considerable forces being imparted against the pinching mechanisim, which in turn will be forced against the down stream portions of the sleeve supports 12 which in turn will transmit these forces against the flange plate of the valve housing 10. The forces thus transmitted are in turn dissipated, firstly agaitnst the opposing pipe line flange 20 when same is bolted to the housing 10 and secondly, forces are transferred via the structure of the housing 10 to the up-stream corresponding pipe flange (not shown). Although as previously stated, the valve of the invention can stand considerable internal pressures without suffering structural failure, presently recognized international specifications require specific flange thicknesses depending upon working pressure requirements. In order to comply with such international specifications, the valve of the invention may optionally be provided with back-up split flange rings 21 as seen in FIG. 2.

Furthermore, the valve of the invention may be adapted to accept a full range of standard threaded ports by simply bolting on any number of standard screwed flanges. These embodiments are not shown in the various drawings as they are standard features well known by any person familiar with this field of the art.

Figure 6:
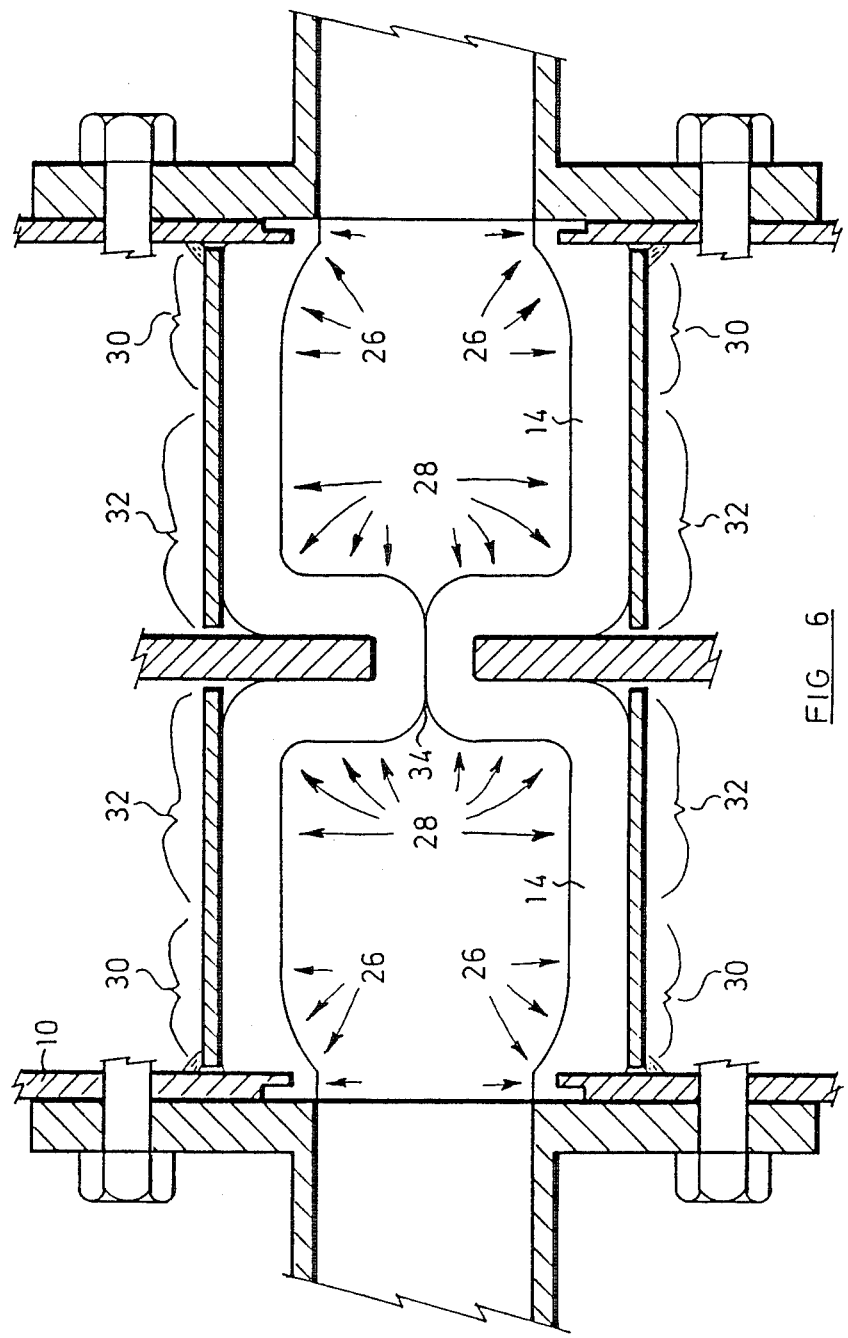
FIG. 6 showes a schematic sectioned view of the valve in a closed configuration.

In FIG. 6, a valve in accordance with the invention can be seen in the closed configuration. The arrowed areas 26 indicate the lip seal effect previously mentioned which occures when the sleeve 14 is under internal fluid pressure, whilst the arrows 28 indicate the tendency of the flexible sleeve 14 to conform closely to the contour within the closed valve. In this configuration, the flanged sleeve 14 is also bonded in the areas 30. This leaves the sleeve 14 free to stretch and slide over the un-bonded areas 32. It can be seen that because of the elastic nature of the sleeve 14, a fairly large seal 34 is formed where the sleeve 14 is drawn together at closure.

It will be apparent to persons skilled in this field of the art that the valve of the invention provides a number of significant advantages by comparison to the valves which are currently being used in many industrial and agricultural applications.

I claim:
1. A valve comprising in working combination a housing; interposed between two opposite sides of said housing (10), in longitudinally spaced apart substantially coaxial alignment with one another, are a pair of generally cylindrical sleeve supports (12, 12a), said supports including outwardly belled or flared forma- tions at their respective adjacent opposing ends (18, 18a) and further being adapted so as to receive, encompass and support in a sealed manner a resiliently deformable sleeve (14); means adapted to close the valve by inducing pinching formations into closed relationship about the flexible sleeve between the spaced sleeve supports; the housing further being adapted to be coupled to one or more corresponding flange faces at each opposite end.

2. A valve as claimed in claim 1 characterised in that the housing takes the form of an open-sided box formation.

3. A valve as claimed in claim 1 wherein the resilient flexible sleeve includes no integral reinforcing of its own but relies upon bracing from the sleeve support to withstand high internal fluid pressures.

4. A valve as claimed in claim 1 where the sleeve supports are welded to the inner side of the housing such that the sleeve supports are in the closest practicable proximity to the pitch circle diameter of the flange drillings.

5. A valve as claimed in claim 1 where means is provided to limit travel of the pinching formations in their closed configuration.

* * * * *